United States Patent [19]
Schlumberger

[11] Patent Number: 5,276,613
[45] Date of Patent: Jan. 4, 1994

[54] PROCESS AND DEVICE FOR COORDINATING SEVERAL IMAGES OF THE SAME OBJECT

[76] Inventor: Etienne Schlumberger, 8 rue Emile Deslandres, 75013 Paris, France

[21] Appl. No.: 23,179

[22] Filed: Feb. 25, 1993

Related U.S. Application Data

[63] Continuation of Ser. No. 450,251, Dec. 13, 1989, abandoned.

[30] Foreign Application Priority Data

Dec. 14, 1988 [FR] France .................. 88 16458

[51] Int. Cl.$^5$ ........................... G06F 15/42
[52] U.S. Cl. ............................. 364/413.16
[58] Field of Search ............ 364/413.16, 413.17; 359/117; 356/12-; 382/2, 6; 358/88

[56] References Cited

U.S. PATENT DOCUMENTS 4,303,829 12/1981 Wagner ..................... 250/445
4,769,756 9/1988 Webber et al. ............ 364/413

FOREIGN PATENT DOCUMENTS 0010797 5/1980 European Pat. Off. .

OTHER PUBLICATIONS

Artificial Intelligence, vol. 30, No. 3, (Dec. 1986) pp. 289-341, M. Herman et al. "*Incremental Reconstruction of 3D Scenes from Multiple, Complex Images*".

*Primary Examiner*—Gail O. Hayes
*Attorney, Agent, or Firm*—Kenyon & Kenyon

[57] ABSTRACT

The process provides for coordinating several images of the same object obtained by transparency projection or photographic like reproduction on one or more image planes from at least two sources, by spatially positioning each image, the exact position of the rays contributing to form the image. A set of at least five points, called "markers", four located in a same plane, and one outside, can be associated to the object. The traces of these markers on the various images can then be used to define the location of the sources and image planes in relation with the marker system. In a more general approach, a required number of identifiable points of the object, but of unknown position, may be used to fully characterise locations in space.

17 Claims, 7 Drawing Sheets

FIG_1

FIG_1a

FIG_2

FIG_3

FIG_4

FIG_7

FIG_8

PROCESS AND DEVICE FOR COORDINATING SEVERAL IMAGES OF THE SAME OBJECT

This is a continuation of application Ser. No. 07/450,251 abandoned filed on Dec. 13, 1989.

BACKGROUND OF THE INVENTION

1. Technical Field

The object of this invention is a process for spatially coordinating several images of the same object obtained either by a transparency projection or by photographic-type reproduction.

2. Related Art

The use of fixed equipment for taking for example X-ray images, of objects from different angles, in order to obtain the data required to reconstruct three-dimensional images, presents drawbacks in terms of space required, stability and cost. However, such equipment has been employed until now to provide accurate coordination between the images; such coordination being required in order to reconstruct the volume represented by these images. The most common examples are body scanners.

In most cases, the raw elements produced by the analysis are displayed on two-dimensional images such as, for example, radiographs. On such images, the characteristic of each point of the image is a result of the cumulative characteristics of all the points of the object being projected at that point of the image.

In order to obtain all of the required information, the observer must, in many instances, view an object from several different angles; however, the observer in this case often experiences difficulties in coordinating the various available images.

Modern technology increasingly relies on computer-aided reconstruction techniques, as in the case of the body scanner.

More generally, computer processing of several interrelated images requires that the said images and the sources generating them be precisely positioned in relation to each other and to the objects such that, during processing, it will be possible to unequivocally determine the exact position in space of all the rays forming the points of the various images.

In the text which follows, the word source is employed to designate the point in space from which diverge the various rays contributing to form the image (for example, X-ray source in radiography, objective in photography).

The same problem is encountered when, for example, it is necessary to correlate images obtained using different processes such as, for example, radiography and scintigraphy.

In order to achieve the desired result, the practice which comes to mind consists of maintaining the object to be observed in a fixed, specific position in relation with the means of observation, which are also located in a precise manner. More particularly, it is then essential that the object be immobilized while the series of views are taken. This practice is constraining and significantly restricts the possibilities of taking views.

The object of this invention is to propose a process to provide unequivocal definition for each image of the position of the source and of the plate supporting said image relative to the object, thus providing a precise coordination of images between themselves, without requiring the use of heavy and costly fixed equipment.

According to a particular application of the invention, the process for spatially coordinating several images of the same object obtained by projection onto one or more image planes using at least two sources is characterized by the following steps:

a) associating to the object at least one set of at least five points connected in a fixed position relative to the object and called markers, wherein at least four of said points are located in a plane called the reference plane and at least one of said points lies outside said reference plane, wherein the nature and position of said markers are such that they appear on said images and may be identified individually;

b) determining, from the respective projections of said markers lying in said reference plane on each of said image planes related to said sources, the respective directions of the intersections of each of said image planes with said reference plane;

c) then determining, from the respective projections of said outside markers, the position of each of said sources relative to said reference plane and that of each of said image planes;

d) coordinating, by identifying the positions of said image planes and of each of said sources relative to said set of markers, the various lines which produce the projections of said object on each of said image planes.

The use of such a system gives the possibility of taking a series of pictures while leaving to the object some latitude in movement, either by using a single picture-taking system and moving the object, or by moving the picture-taking system around the object or, finally, by using two different viewing processes, wherein the only and easily satisfied requirement is that the markers connected in a fixed position relative to the object be visible on all the images.

The discovery of the properties of a set of markers according to the invention that permit coordination of several images of the same object discloses an unexpected feature in that the inventor has demonstrated that other systems comprising, for example, only three points defining a plane and one point lying outside that plane, or five coplanar points, do not solve the general problem of image coordination. The idea of combining at least four coplanar points with at least one outside point to obtain a set of markers offers, in this respect, an unexpected and novel solution to the problem.

According to a preferred embodiment of the invention, there are five marker points; four of these points form the vertices of a tetrahedron, while the fifth lies on one of the faces of this tetrahedron. Indeed, considering a figure of four points in one plane, projected onto another plane from a source at a finite distance, it can be demonstrated that once the initial figure and its projection on another plane are known, the direction of the intersection of the two planes can be determined. Once this direction is known, it is then possible to determine the correspondence of all the points in the image plane with what would be the reversed projections of these points on the plane of the initial figure and, in particular, the position of the projection of the outside point on the plane of the initial figure and, consequently the direction of the source at that point. Once this direction is known, the other points are used to locate both the source and the plane of the projected figure relative to the markers.

Thus, it is possible to determine the relative locations of the image plane, the source, and the markers, and consequently of all the projection lines in space forming the images of the object.

However, when the sources lie at infinity and the projection is therefore cylindrical, four points are sufficient, wherein three of these form a reference plane and the fourth lies outside this plane.

In addition, when the reference plane and the image plane are parallel to each other, the intersection of the two planes is at infinity. Two points are then needed outside the reference plane in order to establish the position of the source and that of the image plane. A limiting situation occurs in the case wherein the reference plane and the image plane are not only parallel but also substantially coincident.

According to another aspect of this particular embodiment of the invention, it is possible to spatially coordinate several images of the same object, obtained by projection on an image plane and related to at least two sources. The process is then characterized by the following steps:

A) associating to the image plane a reference plane related to said object which is subtantially coincident with said image plane and a system of markers comprising at least two pairs of markers comprising at least two points lying in said reference plane and at least two points lying outside said reference plane, wherein the lines connecting each outside point to the corresponding point in said reference plane are parallel and define a cylindrical projection direction;

B) determining the positions of said sources from the projections of said outside points on said reference plane;

C) determining from the positions of said markers lying in said reference plane, the projections of said sources parallel to said connecting lines and their positions in space, relative to said projections of said outside points;

D) then determining, from said cylindrical projections of said sources and from the respective projections of the points of said object, the cylindrical projections of said points of said object on said image plane and their spatial dimensions;

E) then determining, from said cylindrical projections of said sources on said image plane and the respective projections of the object on said image plane and from said sources, a polyhedron defined in said image plane, delimiting the cylindrical projection of said object along said direction of cylindrical projection, and F) determining, from said spatial positions of said sources and from the projections of said object, obtained from said sources, an enclosed, three-dimensional space containing said object.

Thus, this particular embodiment of the process according to the invention takes into account a situation encountered in practice wherein the reference and image planes are coincident. In this case, the function of the markers according to the invention is to locate an object in space as well as the various sources employed in the process.

In all of the embodiments of this particular aspect of the invention, whether there are five markers (four coplanar points and one point lying outside the plane), or when the reference plane and the image plane are parallel (three points defining a plane and two points lying outside the plane) or coincident (two markers in the reference plane and two outside points), or wherein the sources are at infinity (four points), the procedures employed in carrying out the different steps of the process are similar: determining the positions of the sources relative to the set of markers, then the position of the image plane and, once the positions have been determined, locating in space the rays producing the images of the object in relation with the set of markers.

The essential difference between these two aspects of the process according to the invention lies in the fact that the number of spatial unknowns that needs to be determined is smaller in the latter aspect of the invention (coincident image plane and reference plane) than the number of unknowns considered in the first aspect, wherein determining the relative position of the image plane relative to that of the reference plane requires determination of nine unknowns.

When the two planes are coincident, two of the four coplanar markers of the process are superfluous and two markers lying in the reference plane, each associated to a marker outside this plane, are sufficient. However, as in the first aspect of the process, it is possible to provide several coplanar marker points and several outside marker points which, in practice, contribute, by their redundancy, to increasing the accuracy of the image coordination process.

According to another aspect of the invention, a device for carrying out the process comprises means to obtain projections on image planes of at least one object by the transmission of waves affected-by passage through this object from sources of these waves the device further comprising:

marking means connected in a fixed position relative to the object and defining at least one reference plane, wherein the nature and position of said marking means are such that they appear on said images and may be identified individually;

means for determining the directions of the respective intersections of said image planes with said reference plane;

means for determining the respective positions of said sources relative to said marking means;

means for determining the respective positions of said image plane relative to said marking means; and means for coordinating said projections of said object from said positions.

Thus, using the device according to this particular embodiment of the invention, it is possible to coordinate several different projected images when, because the object has moved between taking each of the images, the relative position of the image planes and of the sources relative to the reference plane, and therefore to the object, has changed.

According to a still further aspect of the invention, the process for spatially coordinating several images of the same object subjected to irradiation causing secondary emissions, such as neutron, flux, obtained on one or more image planes from internal radiation sources induced said object, is characterized by the following steps:

A) associating to the object at least one set of at least five points connected in a fixed position relative to the object and called markers, wherein four of said points form a reference plane and wherein at least one of said points lies outside said reference plane, wherein said markers are of a nature such that, after collimation, they provide traces on said images and are positioned such that they appear on said images and may be identified individually;

B) determining, after collimation, on each image produced by said internal sources, the trace of said markers lying in said reference plane and that of said outside point;

C) then determining, after collimation, on each image produced by said internal sources, from the traces of said markers, the directions of collimation and the respective positions of each of said image planes relative to said reference plane; and D) then positioning in space the different collimation lines producing the images of said object on each of said image planes relative to said reference plane.

The process may thus be applied to images obtained by using radiation emitted by an object either from internal sources, such as in scintigraphy, or from external sources, as in the emissions induced by a neutron flux or any other excitation flux, including light rays. The sources are then no longer external to the object but are present on or induced in the object itself.

The device for implementing the process according to the invention in the area of scintigraphy, or in that of induced emissions, comprises:

A) marking means capable of emitting the radiation and defining at least one reference plane and one outside point, wherein the nature and position of said marking means are such that their traces appear after collimation on said images and they may be identified individually;

B) means of determining the collimation directions and the respective positions of said image planes relative to said marking means, from said traces of said marking means; and C) means of spatially coordinating the rays producing the images of said object, from the respective positions of said image planes and said collimation directions relative to said marking means.

This device may also be employed with image coordination devices implementing means which influence the transmission of waves emitted by external sources, such as those described in the foregoing, either by selecting markers of a type such that their traces appear in all of the imaging processes employed, or by using sets of markers which are specific to each case but geometrically interrelated. It is thus possible to associate, for example, radiography and scintigraphy, or neutron imaging, and the images formed by emissions induced by the neutron flux, by providing marker systems adapted to each investigational technique.

The aforesaid processes and devices provide geometric solutions to the problem posed.

The applicant has discovered that the problem of the invention could also be solved using an algebraic solution.

According to this aspect of the invention, the process for spatially coordinating several images of the same object obtained either by a transparency projection or, for instance, by photographic reproduction, wherein these images are obtained from a number n of means on a number n of image planes or surfaces which are coincident or not coincident, is characterized by the following steps:

A) using a set composed of a number p of observable and identifiable points which pre-exist on the objects or are connected in a fixed position thereto and the traces of which are visible on all of the images;

B) determining, from the set of traces of said points on the various images, in a practical system of reference, the coordinates of the various sources, the identifiable points and the image surfaces;

C) these coordinates being calculated using a set of linear equations deriving from the alignment of the points of their images and of the origin of the rays used to form said images of said points; and D) representing this set of relations by a matrix which can be solved if the relation $2pn \geq 9n + 3p - S$ is satisfied, where S represents the number of known geometric relations existing in the system, whereby this relation determines the minimum number of points required.

Other features and advantages of the invention shall b apparent in the description which follows.

BRIEF DESCRIPTION OF THE DRAWINGS

In the appended drawings which are provided as non-limiting examples:

FIG. 11a illustrates the superimposition of three images of a solid object;

FIG. 11b illustrates the application of the coordination process according to the invention to locating the solid object considered in FIG. 11a;

FIG. 12 is a view showing the graphic determination process in the case of sources at infinity.

DETAILED DESCRIPTION OF THE PREFERRED EMBODIMENTS

Figures 1, 1A:
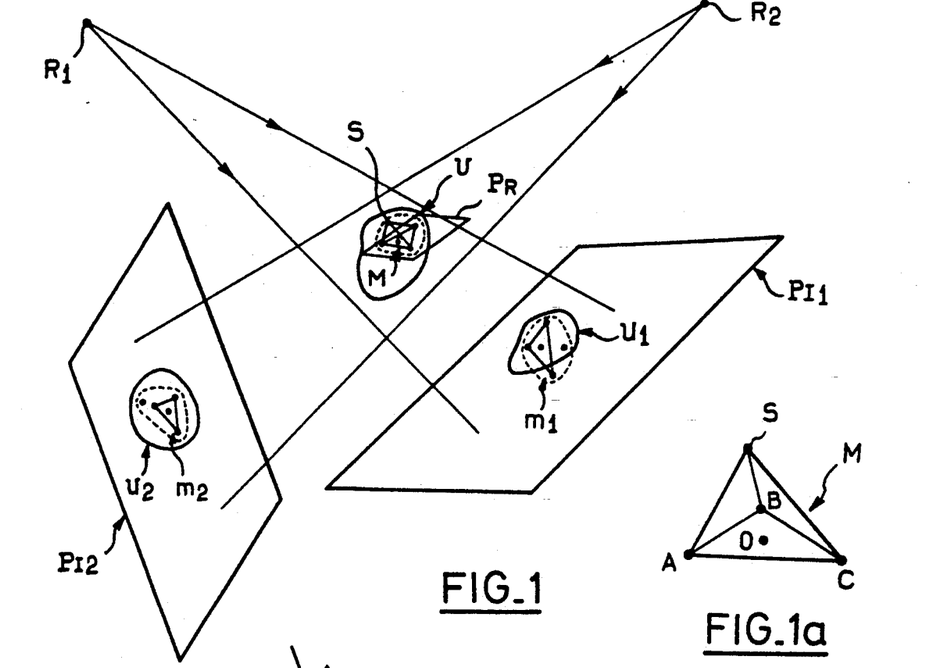
FIG. 1 is a schematic diagram of an object comprising five markers and two projections thereof.
FIG. 1a is an enlarged perspective view of the 5-point marker system of FIG. 1.

The object of this process according to the invention is to make it possible to coordinate several images of the same object. FIG. 1 illustrates the case of a particular embodiment of the process. An object U is exposed concurrently or successively to two beams of waves emitted by two separate and substantially pinpoint sources R1 and R2.

Thus, in the general case, there are two projections u1, u2 of the object U on two separate image planes $P_{I1}$, $PT_{I2}$. The object U was previously provided with a set of markers M, in accordance with the invention.

This system M comprises four coplanar points, which define a reference plane $P_R$, and one outside point S. The markers M are made of a material which affects the transmission of the waves emitted by the sources $R_1$ and $R_2$ and thus displays projections $m_1$, $m_2$ which appear on the image planes $P_{I1}$, $P_{I2}$.

With the process according to the invention, it will be possible to locate the image planes $P_{I1}$, $P_{I2}$ and the sources $R_1$, $R_2$ relative to the set of markers M. Once this locating is achieved, the images $m_1$, $m_2$ may then be easily coordinated, as shall be demonstrated below.

Locating may be performed for each system independently (source R/markers M/image plane $P_I$) and is conducted overall in two steps:

a) determining the direction of intersection of image plane $P_I$ with reference plane $P_R$;

b) determining the position of the source R and the image plane P.

Figure 2:
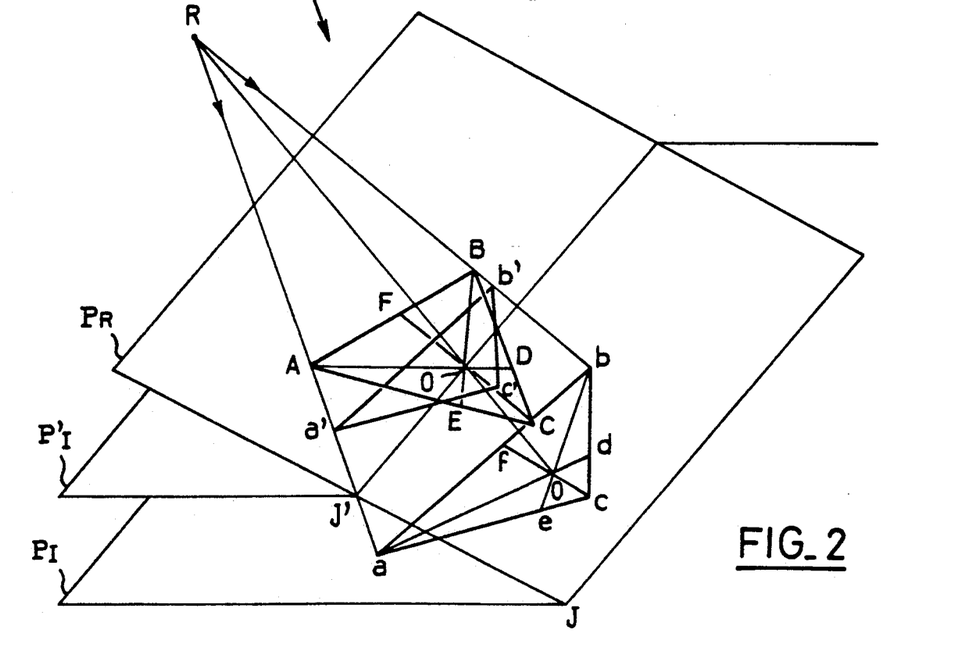
FIG. 2 is a view of an image plane, of a reference plane, and of the markers and their projections on the image plane and on a plane parallel to the image plane.

FIG. 2 illustrates the geometric construction upon which the process according to the invention is based and which is used to determine the direction of intersection. It is essential to determine this direction because of the fact that, regardless of the type of projection, the segments on a projecting line and a projected line, both parallel to said intersection, are in similarity. It is thus possible to use a simple rule for passing from one projection of a point on the image plane to what would be the reversed projection of this point on the reference plane. A set of four points, A, B, C, O in the reference plane $P_R$ is considered.

The presence of the pinpoint source R determines a conical projection of the set ABCO on the image plane $P_I$, represented by abco in FIG. 2.

A plane $P'_I$ is considered, that is parallel to image plane $P_I$ and passes through O, where a'b'c'O represent the conical projections of the set ABCO on the plane $P'_I$ which would be obtained from the source R. The abco and a'b'c'O images are similar.

Figure 3:
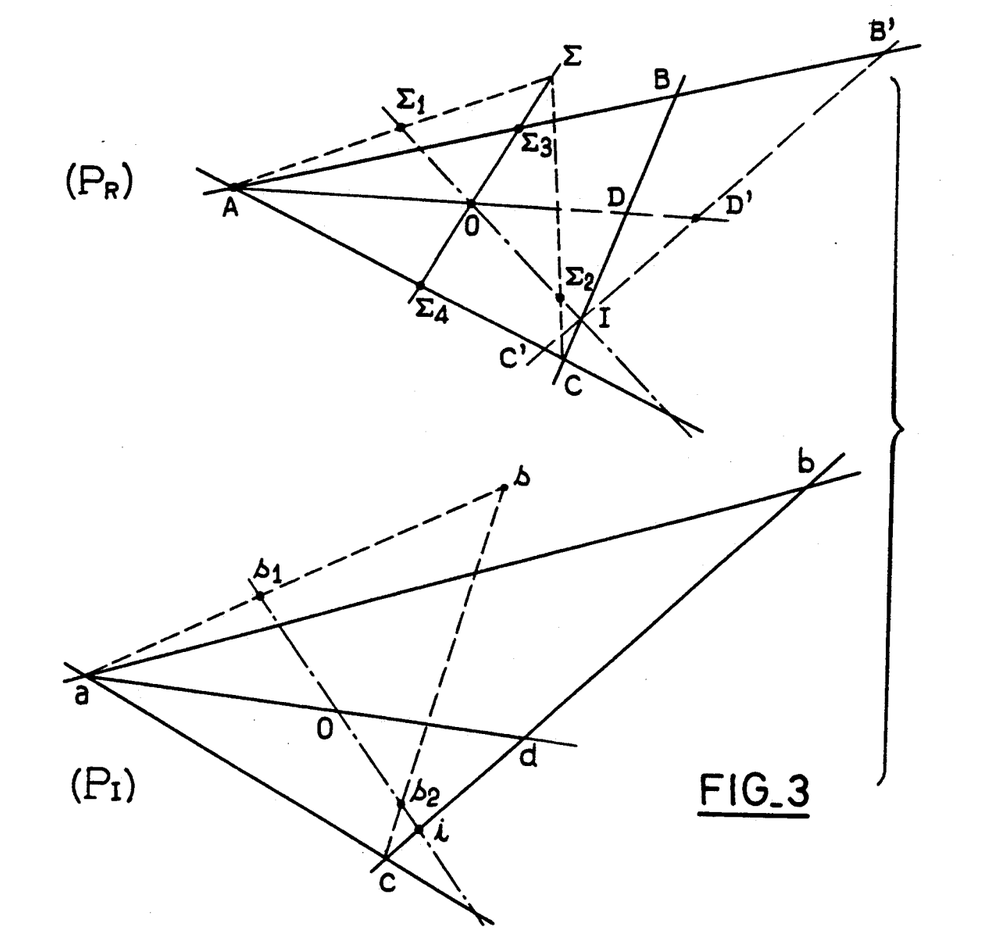
FIG. 3 is a view illustrating the graphic process for determining the direction of the intersection of the image and reference planes.

Let AB'C'O be the set of points lying in the reference plane $P_R$ and representing the cylindrical projections along the direction Aa of points a'b'c'o in the plane $P'_I$ (FIG. 3).

At this stage, the respective positions of points B' and C' relative to the group of markers ABCO are unknowns. However, because of the projection along Aa, wherein the projections of the lines passing through A are maintained, it is known that B' and C' are respectively located along lines AB and AC.

D is the intersection of line AO with line BC, d is its conical projection on plane $P_I$ from the source R, d' is its conical projection on plane $P'_I$ and D' is the cylindrical projection along Aa of d' on the reference plane $P_R$. Only and d are known, while the projections d' and D' are unknown.

A fundamental property of cylindrical projections is that the segments of any two corresponding lines are projected with relations of equality. This same property is found in conical projections between parallel planes.

Referring to FIG. 3, the following can be written:

$$\frac{\overline{AO}}{\overline{OD'}} = \frac{\overline{ao}}{\overline{od}} \tag{1}$$

Given that the lengths of segments $\overline{AO}$, $\overline{ao}$, $\overline{od}$ are known, the length of $\overline{OD'}$, and therefore the position of point D' can be determined, knowing that this point belongs to line AD, because the angles having their vertices at A are maintained.

In addition, due to the equality of the relations of the segments in cylindrical projection, it may also be written that:

$$\frac{\overline{D'B'}}{\overline{D'C'}} = \frac{\overline{db}}{\overline{dc}} \tag{2}$$

The lengths of db and dc are known.

Given that B' and C' are respectively located on lines AB and AC, and knowing the relation D'B'/D'C', it is then possible to determine the position of B' and C' relative to the set of markers ABCO.

In a conical or cylindrical projection, the intersection between the initial plane and the projection plane remains unchanged. B, C and B', C' respectively correspond to b', c' in conical and cylindrical projections. The intersection of lines BC and B'C' thus necessarily occurs on the intersection J' of the reference plane $P_R$ and the plane P'I, which is parallel to the image plane $P_I$ and passes through O.

Let I be the intersection of lines BC and B'C'; then the line passing through O and through I provides the intersection of planes $P_R$ and $P'_I$ and thus the direction of the intersection of planes $P_R$ and $P_I$.

Referring to image plane $P_I$, point i, which corresponds to point I in the cylindrical projection along Aa, may be obtained using the following equation:

$$\frac{\overline{ic}}{\overline{ib}} = \frac{\overline{IC'}}{\overline{IB'}} \tag{3}$$

Given that segments IC' and IB' are known and that i is located on line bc, the position of i in the image plane $P_I$ and the direction of the intersection of image plane $P_I$ with the reference plane can be determined.

In the particular case wherein the figure formed by the four points in the reference plane provides for defining in this plane at least two sets of parallel lines (for example, an isosceles triangle and its barycenter), the convergence point on the image of the projected parallels also indicates the direction of the intersection.

The position of the pinpoint source R relative to the set of markers ABCOS must now be determined.

In the image plane $P_I$, the lines originating from a and c toward s define on line oi segments similar to those defined on OI by the lines connecting points A and B to point Σ, which is the projection of the vertex S on the reference plane $P_R$.

Thus, referring to FIG. 3:

$$\frac{s_1 o}{\Sigma_1 o} = \frac{s_2 o}{\Sigma_1 o} = \frac{s_1 s_2}{\Sigma_1 \Sigma_2} \tag{4}$$

The same method is used to calculate the correspondence of any point in $P_I$ and $P_R$.

In this manner, it is possible to geometrically determine point Σ in the reference plane $P_R$. The direction of the source R is then provided by S Σ.

Figure 5:
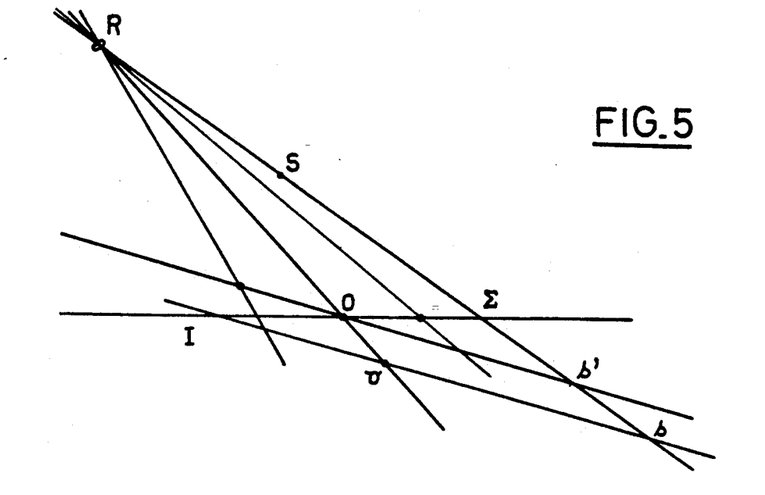
FIG. 5 is a view showing the graphic process for determining the position of a source relative to the reference plane.

Considering the plane passing through points S, Σ and O, in FIG. 5, the conical projection s' of the outside point S on plane $P'_I$ is located on the line passing through S and Σ.

Because the position of s, the conical projection of S on $P_I$, is known relative to triangle a b c, which is similar to triangle a'b'c' in plane $P'_I$, the position of s' easily be determined, as can the distance s'o, in reference to FIG. 5.

Given $\overline{s'o}$ and knowing that s' is a part of line $\Sigma s$, the position of s' in plane $S\Sigma O$ and, similarly, the angle s'O$\Sigma$ can then be determined.

Indeed, the similarity relation of triangles abc and a'b'c' is known by the relation of lengths of the intersections with plane $P_R$ intersected by lines a'b', a'c' and ab, ac; it will be equal to the relation of s'O to so. This construction applies to each point in the plane.

The respective intersections $\Sigma 3$, $\Sigma 4$ of line $\Sigma O$ and segments AB and AC in plane $P_R$ (FIG. 3) and the respective intersections s'3, s'4 of line s'o and segments a'b' and a'c' in plane $P'_I$ (FIG. 4) are also known.

Figure 4:
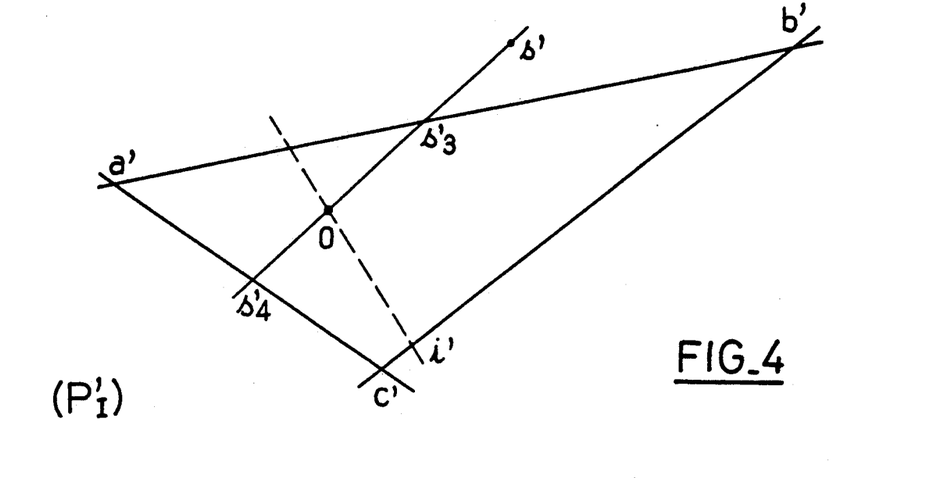
FIG. 4 is a view of an intermediate graphic construction required to determine the position of a source.

The position of the source R can thus be determined by intersection of lines $\Sigma_3 s'_3$ and $\Sigma_4 s'_4$, where points $\Sigma_3$, $\Sigma_4$ respectively correspond to s'3, s'4 in the conical projection relative to source R.

This provides the position of the source R and direction of the intersection J' relative to the set of markers ABCOS, and of the angle defined by planes $P_R$ and $P'_I$ on plane $SO\Sigma$.

Once these elements are known, it is possible to determine the location of the intersection of the reference plane with the image plane and, subsequently, the location of the image plane.

This process may be applied to other source/image plane systems based on the same principle of markers. Therefore, using these markers, it it possible to coordinate images of the same object produced by different methods.

The use of four coplanar points and one point outside the plane, as described in the foregoing, may not provide enough redundancy in the case of certain images: adding more points will necessarily provide more information. This is particularly the case when two outside points are used instead of one: indeed, once the direction of the intersection has been determined, the use of these two points provides for immediately locating the source. Similarly, as indicated in the foregoing, these two outside points may be necessary in certain specific cases.

Similarly, a set of markers comprising two sets of four coplanar points provides for selecting the most favorable marker plane from the outset, wherein certain points of two sets may in fact be coincident.

In addition, by combining more than one outside points with several sets of at least four coplanar points, such that the functions of outside points and coplanar points may be interchanged and combined, it is possible to obtain optimum resolutions in terms of precision and redundancy.

Figure 6:
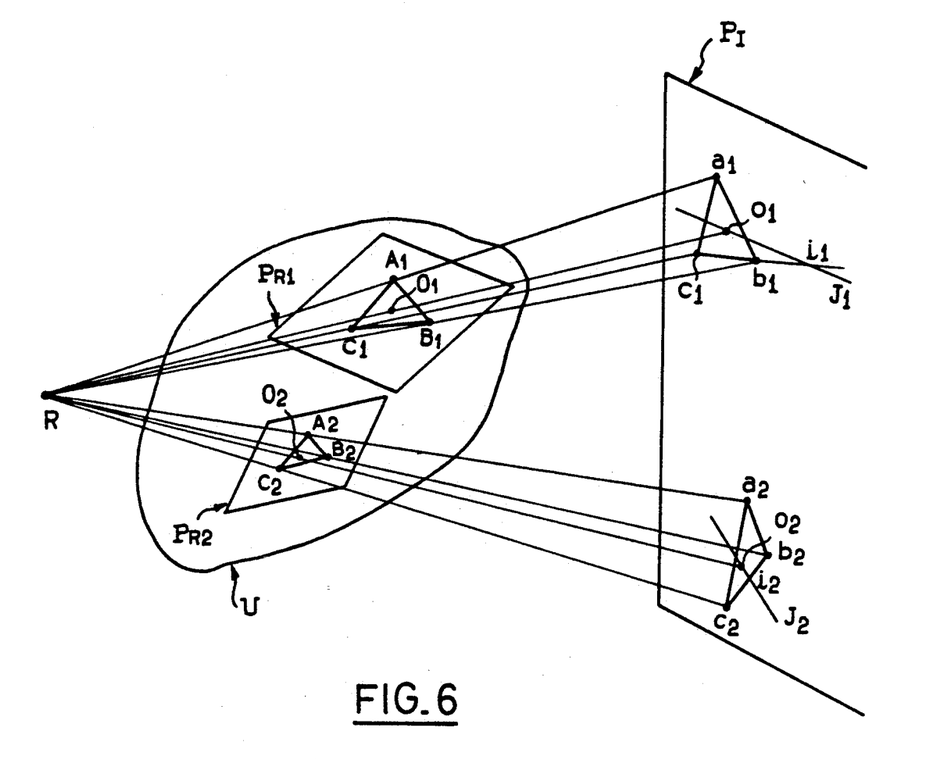
FIG. 6 is a view illustrating a particular version of the process according to the invention wherein the marker system comprises two related sets.

FIG. 6 illustrates the case wherein the markers are composed of two sets of four coplanar points located, respectively, in reference planes $P_{R1}$ and $P_{R2}$ and connected in a fixed position relative to the object U. By applying the aforesaid process according to the invention, it is possible to determine the respective directions of intersection $J_1$, $J_2$ of the reference planes $P_{R1}$, $P_{R2}$ with the image plane $P_I$. The location of the source R relative to the two reference planes $P_{R1}$, $R_2$ can then be determined.

For example, a set of markers shall be considered, wherein they are composed of the four coplanar points A1, B1, C1, O1 in the reference plane $P_{R1}$ and of an outside point selected from among one of the other coplanar points A2, B2, C2, O2 of plane $P_{R2}$.

By applying the process described in the foregoing in the case of a single set of markers, it is possible to determine, from A1, B2, C1, 01, the direction of the intersection $J_1$ of the image plane $P_I$ with the reference plane $P_{R1}$, then, using the outside point, the position of the source and of the image plane.

By proceeding in a symmetrical fashion with the set of markers A2, B2, C2, O2 with the addition of any of the points in the reference plane $P_{R1}$, it is possible to obtain the direction of the intersection $J_2$ of the image plane J with the reference plane $P_{R2}$. The location of the source R and of the image plane may then be determined in the manner described in the foregoing.

By using two reference planes, which must necessarily be linked, improved accuracy in positioning can be achieved in most cases, since eight redundant sets of markers are available for use. It is also possible to use two complete sets of related markers comprising five points.

Figure 7:
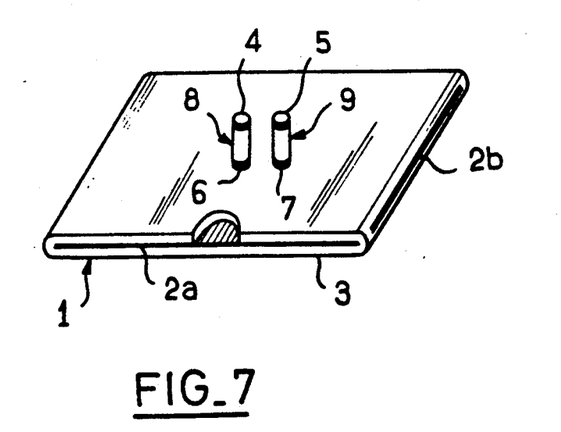
FIG. 7 is a perspective drawing of a physical embodiment of a marker system wherein the image and reference planes are substantially coincident.

FIG. 7 illustrates a particular case wherein the plane of the initial image and the plane of the projected image are either coincident or so close together that they can be considered to be coincident. This case is more particularly encountered in dental imaging.

An effective but non-limiting embodiment of the process is described below.

A photographic plate 3 is inserted in a rigid cartridge 1 which is X-ray-transparent, through either of slots 2a, 2b. The cartridge 1 comprises two posts 8, 9 which are perpendicular to the reference plane of the cartridge.

Each post 8, 9 is respectively fitted with two elements 4, 6; 5, 7 made of a material which specifically affects the transmission of X-rays, such as lead, for example, and which may, if necessary, be identified.

The cartridge is placed in the patient's mouth, in a position which, a priori, is not accurately defined but which will not move relative to the dental system. Different pictures are taken after changing the photographic plate; in the course of picture-taking, the relative location of the X-ray source, $R_1$, $R_2$, has changed relative to the cartridge and therefore relative to the mouth. One object of the invention is to provide to the practitioner a process for coordinating the different images so as to enable him to interpret the different projections of the object and to accurately locate an object in space; the object in this case being either a tooth, a set of teeth or a detail such as an impacted tooth, for example.

The various plates are superimposed by using the traces of the bases of the two posts as a frame of reference for the superimposition.

Given two posts $\sigma$ and $\sigma$ having bases $\beta$ and $\beta'$ and vertices $\alpha$ and $\alpha'$.

Figure 8:
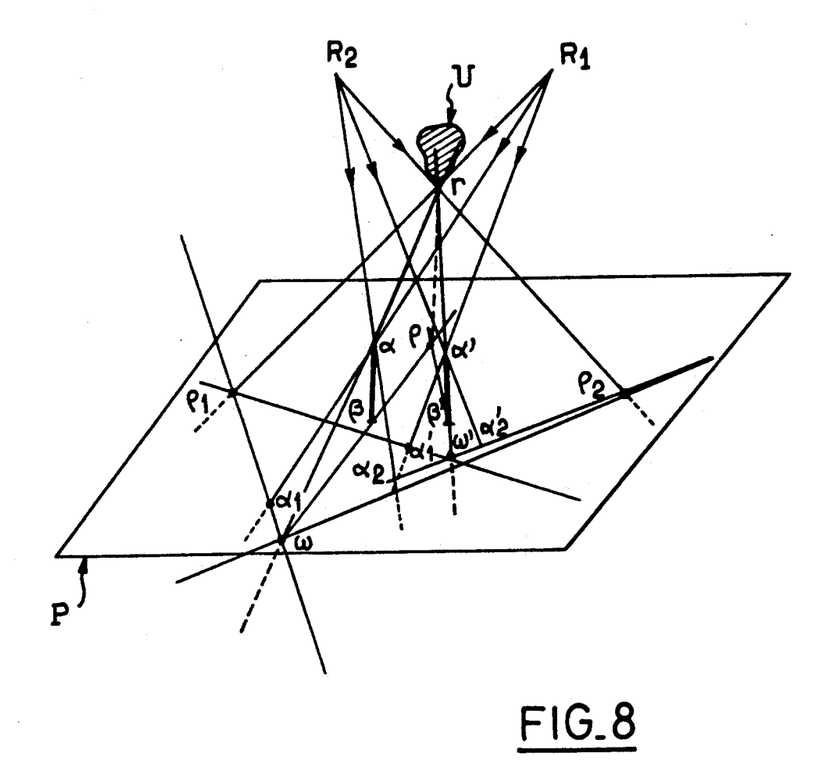
FIG. 8 is a perspective drawing of the geometric construction created from the projections of the marker system of FIG. 6.
Figure 9A:
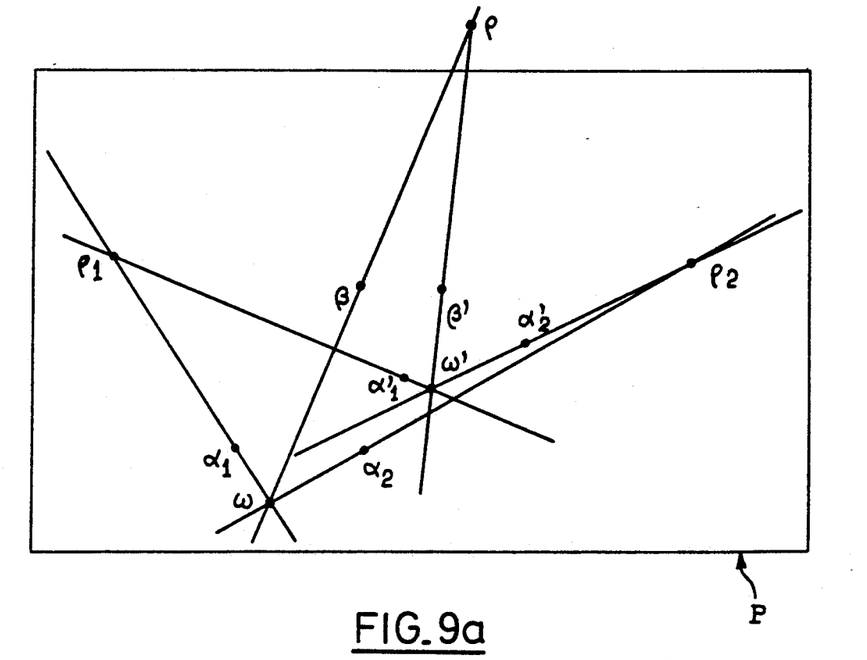
FIG. 9a is a view of the geometric construction developed in the reference plane to determine the vertical projection of a pinpoint object, in the specific configuration of FIG. 7.

FIG. 8 is a schematic diagram of the geometric construction according to the invention which produces the projection from a point r of an object U on the plane P along the direction of posts $\beta\alpha$, $\beta'$ $\alpha'$, in the case of two point sources $R_1$, $R_2$. FIG. 9a represents the various projections in the plane P.

Let $\alpha_1$ and $\alpha_2$ be projections on plane P of the vertex of post $\sigma'$, respectively obtained from sources $R_1$ and $R_2$.

Let $\alpha_1'$ and $\alpha'_2$ be the projections on plane P of the vertex of post $\sigma'$, obtained respectively from sources $R_1$ and $R_2$.

Let $\rho_1$ and $\rho_2$ represent the projections on plane P of point r, belonging to the object U of unknown location, obtained respectively from sources $R_1$ and $R_2$.

A noteworthy geometric property is that the intersections with plane P of planes $\rho_1\rho_1 R_1$ and $\rho_2 \alpha_2 R_2$, which both pass through $\alpha$, converge at a point $\omega$.

Because these two planes pass through the vertex $\alpha$ and the point r, points r$\alpha\omega$ are aligned as a result. The same situation applies to the intersection $\omega'$ of the intersecting lines of planes $p_1 \alpha'_1 R_1$ and $p_2 \alpha'_2 R_2$. Therefore, r, $\alpha'$, $\omega'$ are aligned and r is located at the intersection of lines $\omega\alpha$ and $\omega'\alpha'$.

The position of r in space may then be defined by obtaining its projection p on plane P along the common direction of the posts and its distance from plane P.

The projection p is obtained by intersecting lines $\omega\beta$ and $\omega'\beta'$, as shown in FIG. 9a. The height of point r is obtained by the simple geometric construction shown in FIG. 9b.

An example of an embodiment of the coordinating process according to the invention shall now be described in detail in its application to the interpretation of dental films, by considering three images obtained from three point sources $R_1$, $R_2$, $R_3$, referring, first, to a pinpoint object and, second, to a solid object.

It is assumed that three images C1, C2, and C3 (FIG. 10) were taken using a cartridge equipped with markers in accordance with the invention and described in the foregoing (FIG. 7).

Figure 10:
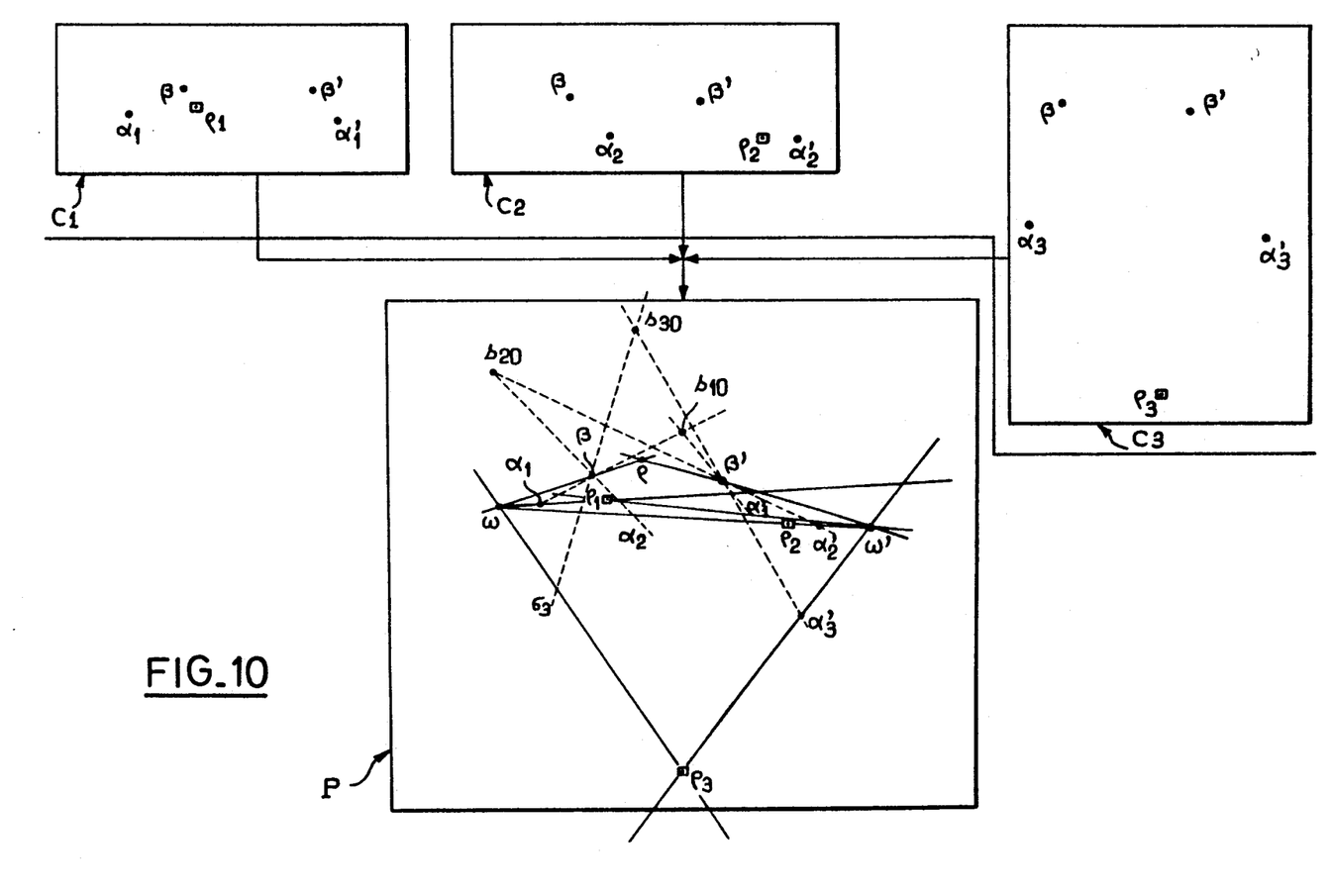
FIG. 10 illustrates the step according to the invention wherein three images are superimposed.

These three images of the same pinpoint object r include traces $\beta$, $\beta'$ of the bases of the two posts 8, 9; the respective projections $\alpha_1$, $\alpha'_1$; $\alpha_2$, $\alpha'_2$; $\alpha_3$, $\alpha'_3$ of the vertices $\alpha$, $\alpha'$ of the posts, and the respective projections $p_1$, $p_2$, $p_3$ of the point r to be defined.

Figure 9B:
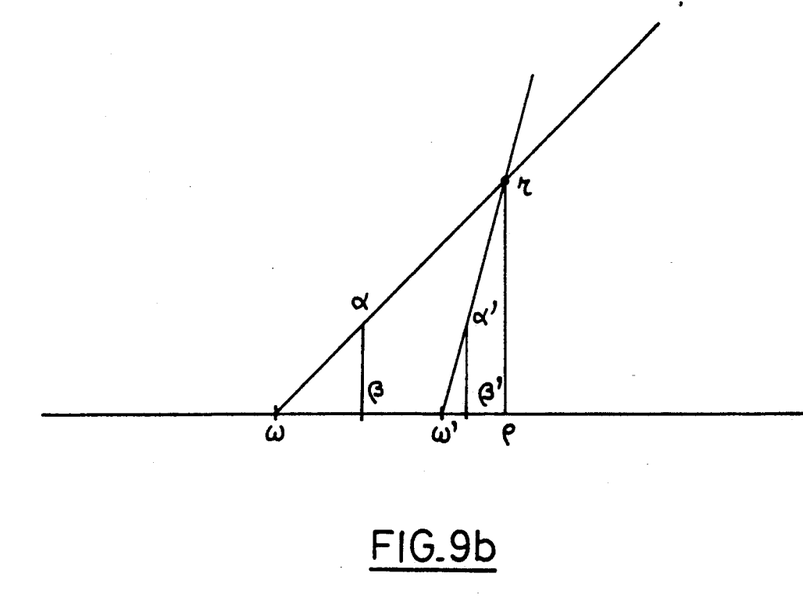
FIG. 9b is a view of the geometric construction used to determine the dimensions of the pinpoint object, the vertical projection of which was determined in FIG. 7.

The first step consists of superimposing the three images C1, C2, C3 while ensuring that the pairs $\beta$, $\beta'$ of each image are superimposed. This step may be carried out by using transparencies, for example, but it may also be achieved by computer aided image processing of the images, or by mapping, or by any other system. After superimposition, it is easy to construct the projection p of the desired point r along the line of the posts by using the technique described in the foregoing (FIGS. 8, 9a and 9b). Of course, it is apparent that points $\omega$ and $\omega'$ are the same regardless of the pairs of sources contemplated, $R_1/R_2$, $R_2/R_3$, $R_1/R_3$. The use of three sources instead of two provides for increased accuracy in determining the projection of point r insofar as, in practice, these points are not always exactly points but spots of varying diameters.

It is also possible to determine the respective projections $s_{10}$, $s_{20}$, $s_{30}$ of the sources $R_1$, $R_2$, $R_3$ along the axial direction of posts 8, 9.

Indeed, considering as an example the projection $s_1$ from the source $R_1$, this projection must necessarily be aligned with the trace $\beta$ of the base of the post 8 and with the projection $\alpha_1$ of the vertex $\alpha$ of the same post because $\beta$ and $\alpha$ define a line parallel to the line passing through $R_1$ and $s_{10}$, by construction of $s_1$.

Similarly, $s_{10}$ must necessarily be aligned with trace $\beta'$ of the base of post 9 and with the projection $\alpha'_1$ of the vertex $\alpha'$ of the same post, for the aforesaid reasons.

Thus, $s_{10}$ can be determined by the intersection of lines $\alpha_1\beta$ and $\alpha'_1\beta'$. The other two projections $s_{20}$ and $s_{30}$ may be determined in the same way, by the intersection of lines $\alpha_2\beta$ and $\alpha'_2\beta'$ for $s_{20}$ and by the intersection of lines $\alpha_3\beta$ and $\alpha'_3\beta'$ for $s_{30}$.

After determining the projections $s_{10}$, $s_{20}$, $s_{30}$, height $\beta\alpha$ of the post and the position of the projections $\alpha_1$, $\alpha_2$, $\alpha_3$ of the vertex of the post 8, it is then possible to determine the distance of the sources $R_1$, $R_2$, $R_3$ relative to plane P and to posts 8, 9.

The sources $R_1$, $R_2$ and $R_3$ are therefore positioned in space relative to plane P. The coordination of the three images C1, C2 and C3 is then complete since the relative positions of the pinpoint object r and the sources $R_1$, $R_2$ and $R_3$ are known, relative to the set of markers $\alpha$, $\alpha'$, $\beta$, $\beta'$.

Furthermore, a plane containing two sources, $R_1$ and $R_2$, for example, and a point r, will intersect the image plane along line $p_1$ and $p_2$. The plane parallel to the posts and passing through the two sources $R_1$ and $R_2$ will intersect the image plane along lines $s_{10}$, $s_{20}$. These two lines intersect at the point of intersection of line $R_1 R_2$ with the image plane and all lines joining the corresponding projections of a point converge at that point.

When considering a solid object, the process according to the invention provides for locating this object in space by delimiting a volume containing the object, by six planes tangent to said object, wherein the location of the six tangency points may be determined in space.

Figures 11A, 11B, 12:
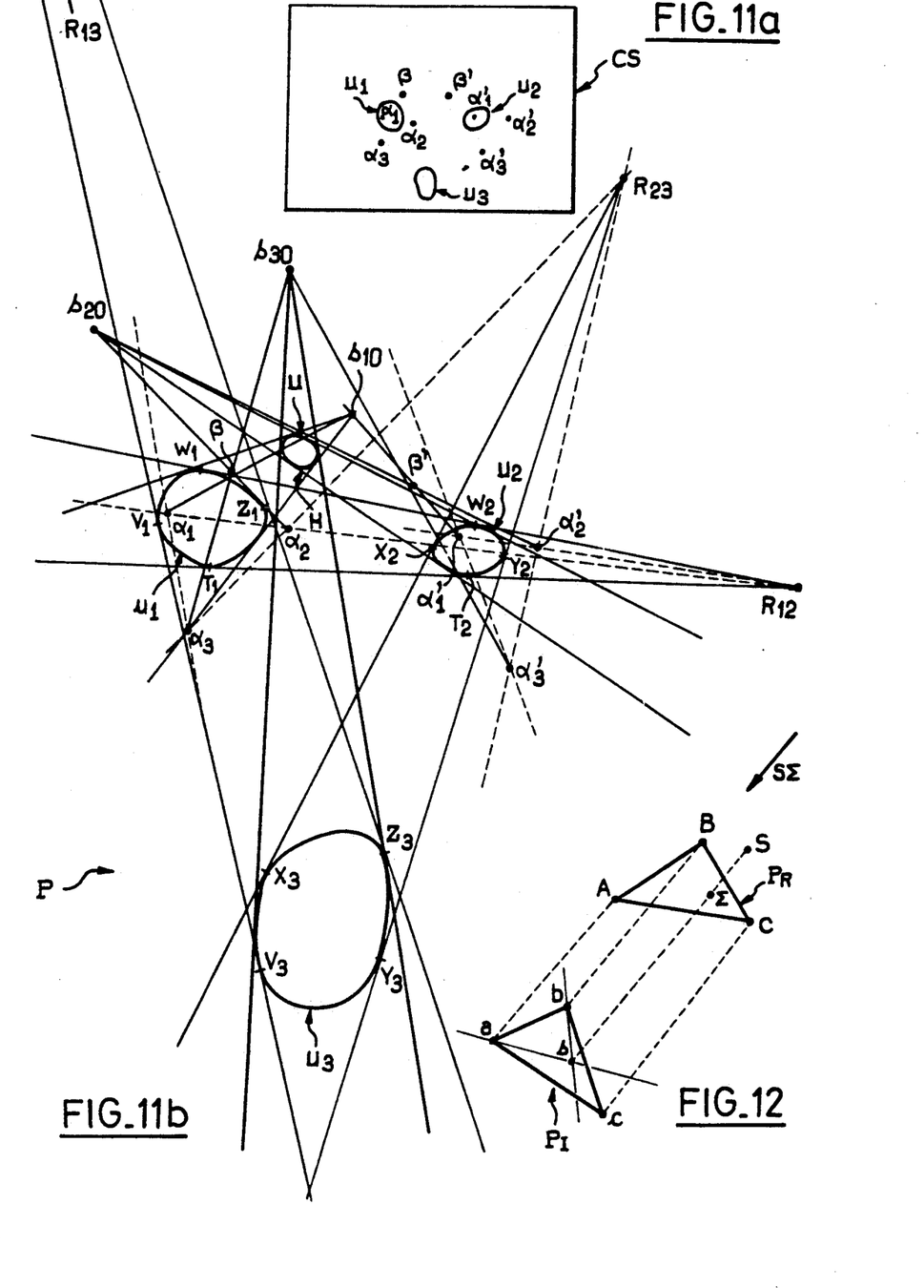

In reference to FIG. 11a, we shall consider three superimposed images of a solid object U, obtained from three point sources $R_1$, $R_2$, $R_3$ having an unknown position, a priori, with respect to markers $\beta$, $\beta'$, $\alpha$, $\alpha'$ in a cartridge such as the one shown in FIG. 7.

The superimposed image CS shows the respective projections u1, u2 and u3 of the solid object as well as the traces $\beta$, $\beta'$ of the bases of posts 8, 9 and the projections $\alpha_1$, $\alpha_2 \alpha_3$; $\alpha'_1 \alpha'_2 \alpha'_3$, as described in the foregoing.

The object of the process according to the invention is to position, on the one hand, sources $R_1$, $R_2$ and $R_3$ and, on the other hand, the solid object U. In order to achieve this, it is necessary to determine the projections $s_{10}$, $s_{20}$ and $s_{30}$ of the sources $R_1$, $R_2$, $R_3$ on the plane P along the direction of the posts and the respective distance of the sources $R_1$, $R_2$, $R_3$, relative to the plane P. This determination is made as described in the foregoing. Once $s_{10}$, $s_{20}$ and $s_{30}$ are known, it is possible to determine a hexagon containing the projection of the solid object U on the plane P along the direction of the posts. Indeed, considering, for each projection u1, u2, u3 of the object U on the plane P from point sources $R_1$, $R_2$, $R_3$, the two lines issued from each source projection $s_{10}$, $s_{20}$, $s_{30}$ and tangent to the projection u1, u2, u3, the intersection of the three sets of lines, intersections with the image plane of planes parallel to the posts and tangent to the object define a hexagon H in which the projection u is inscribed.

In addition, it is possible to determine six points of tangency belonging to the object U which is to be positioned.

The following geometric property, which was mentioned earlier, may be employed:

The projected images of any point from two sources are located on a line passing by the intersection of the line connecting the two sources with the projection plane.

To define the corresponding intersections $R_{12}$, $R_{23}$, $R_{13}$, the following lines are traced, respectively:

the line passing through $\alpha_1$ and $\alpha_2$ and the line passing through $\alpha'_1$ and $\alpha'_2$, the line passing through $\alpha_2$ and $\alpha_3$ and the line passing through $\alpha'_1$ and $\alpha'_3$, the line passing through $\alpha_1$ and $\alpha_3$ and the line passing through $\alpha'_2$ and $\alpha'_3$.

In addition, the apparent contours of two projections, u1 and u2, from $R_1$ and $R_2$, for example, of object U are tangent to two lines passing through the same intersection $R_1 R_2$ with plane P: The tangency points are spatially defined by the tangency to the object in the plane passing through $R_1$ and $R_2$ whose trace on the image plane is the common tangent. The same reasoning may be applied to pairs $R_1$, $R_3$ and $R_2$, $R_3$. With three sources, there exist six of these points having known locations in space and which provide for locating the object.

In the example shown in FIG. 11b, from intersection $R_{12}$, the points of tangency $W_1$, $T_1$ (projection u1) and $W_2$, $T_2$ (projection u2) are defined in plane P. The points of tangency $X_2$, $Y_2$ (projection u2) and $X_3$, $Y_3$ (projection u3) are defined from the intersection $R_{23}$ and the points of tangency $Z_1$, $V_1$ (projection u1) and $Z_3$, $V_3$ (projection u3) are defined from the intersection $R_{13}$ (not shown). It is then easy to determine the position in space of the six points W, T, X, Y, Z, V, knowing their respective projections on plane P, by using the method described in the foregoing.

Each of the points of tangency W, T, X, Y, Z, V corresponds to the tangency with the solid object U of a plane passing through two of the three sources $R_1$, $R_2$, $R_3$.

The combination of these six planes therefore defines a volume in which the object whose points of tangency are known is inscribed.

The geometric method described herein may be employed graphically; or it may be programmed in a computer or processor, or be applied using mechanical devices such as needles or drawn-out strings which are mobile and adjustable to figure the various projection rays or lines, or by light rays, or by any other means of simulation, used alone or in combination.

In the specific case wherein the source is at infinity, or in scintigraphy, for example, collimation ensures that the rays forming the image are parallel and, then, all segments on the lines of the projecting image and the projected image are proportional. It is thus simple to identify the reversed projection $\Sigma$ of the outside point S on the reference plane, from its projection s on the image plane, referring to FIG. 12. The direction S$\Sigma$ then immediately provides the direction of the parallel projection; let ABC be the triangle in the reference plane which projects itself on the image plane at abc; S$\Sigma$ is sAa, the direction of parallel projection. In the plane S$\Sigma$ is Aa, it is possible assuming that s and ' are coincident, to construct the figure SsAa since Ss, SA, sa and the direction Aa parallel to Ss are known. The same applies for the plane S$\pi$ sBb. The position of the image plane defined by the lines Sa and Sb can be derived therefrom.

The specific processes described in the foregoing show a geometrical solution, in order to relate them to reality and to illustrate their practical aspects. However, these processes may also be resolved using sets of equations primarily consisting of linear equations. Depending on the case, one solution or the other may be adopted; however, the more complex the network of identifiable points, the more advantageous is the algebraic solution. More particularly, this is the case when combining the "marker" points of known geometry but of insufficient numbers, for example, when combining four points, whether or not they are coplanar, with other points which are identifiable but of unknown geometry.

This type of situation may also arise when there are sufficient numbers of "Markers" but wherein some of their traces do not appear on some of the images, and, conversely, there exist identifiable points.

Finally, it is possible, from a reduced number of images comprising the traces of a complete set of "Markers" of known geometry, to establish the geometric relation with a set of identifiable points, as indicated in the case of dental plates.

The description which follows explains the algebraic solution of the process according to the invention.

The precise coordination of images among themselves requires a definition of the space containing the object, which may be done, for example, with reference points of fixed position relative to the object and giving traces on the images from which the definition can be made.

These references may be points, so that there is no ambiguity regardless of the direction in which they are observed; or they may be elements with a distinctive identity providing for specific positioning.

These indicators may either pre-exist on the object and their position may be unknown, such as singular points which are identifiable on the images; or they may be placed on the object and have a known geometry; or they may consist of a combination of the two systems.

In the more general case, it is understandable that the number of identifiable points on the object, of unknown geometric position, required to define the space unequivocally, depends on the number of images of the object. A parametric analysis indicates that there is a solution to the problem.

In the demonstration, the image of the object is assumed to be plane, but the same reasoning applies to any other surface which is only intersected once by the rays.

Indeed, a spatial plane of the equation $AX+By+Cz+1=0$ is characterized by three parameters, A, B and C.

Any point in such a plane is defined by two parameters because its coordinates are not independent but are interrelated by the equation of the plane. A second point whose position is known relative to the first point depends on a single direction parameter, such as being in the plane and at a known distance. Two points in a known configuration relative to each other in the plane are thus defined by three parameters. The coordinates of all other points in a known configuration relative to each other in the plane depend only on these three initial parameters since they are defined by their distances to the two basic points. A known figure in such a plane therefore depends on only three parameters.

A known figure in a plane therefore depends on six parameters: three for the plane and three for the figure.

Every other point in the space, whether it is an identifiable point a source point, is defined by its three coordinates.

Finally an identifiable point, its trace on a plate and the source are aligned.

Three aligned points may, for example, be considered as belonging to two planes and on the intersection of these two planes, and also the ratios of the differences between the coordinates of these three points are equal. This represents two equations between the coordinates of the three points, or three equations linked by one constant.

Thus, if A, B, and C are the unknown parameters of an image plane, if a, b, and c are the unknown parameters of a point in this plane, if a', b' and c' are the unknown parameters of a second point located at a distance r, and if a'', b'' and c'' those of a third point located at distances d of the first and l of the second:

Coordinates of the first point a, b and $c = 1-Aa-Bb/c$

The coordinates of the second point are defined by writing that the distance from the first point is r, or:

$(a - a')^2 + (b - b')^2 + (c - c')^2 = r^2$ with $c - c' = A(a' - a) + \frac{B(b' - b)}{C}$.

The following relation is derived for a', b' and r: $(a - a')^2 + (b - b')^2 + \left[ A(a - a') + \frac{B(b - b')}{C} \right]^2 = r^2$.

The coordinates of the second point are then obtained as a function of a' and r by the two relations:

$(B^2+C^2)(b-b')^2+2AB(a-a')(b-b')+(a-a')^2$
$(A^2+C^2)-C^2r=0$ which provides b' with two possible signs and:

$c' = c - \frac{A(a' - a) + B(b' - b)}{C}$.

Once the distance d and l, d' and l', etc. of the other points from these first two are known, their coordinates, a'', b'' and c'', a''', b''' and c''', etc. are defined as a function of A, B, C, a, b, and a' by distance relations such as:

$(a'''-a)+(b'''-b)^2+(c'''-c)^2=d^2$ and $(a'''-a')^2+(b'''-b')^2+(c'''-c')^2=l^2$.

Thus, all of the known points in an unknown plane are well defined by the six foregoing parameters, called A, B, C, a, b, and a'.

In short, the coordinates of p points known in a plane that can be called $a_1, b_1, c_1$ to $a_p, b_p, c_p$, are a function of 6 parameters.

The inaccuracy due to the sign to be placed in front of the square root may be removed by the operator because the approximate positions of the object, the source and the plates are known.

Let P, Q and R be the coordinates sought for an identifiable point and S, T and U those of a source. Given that the source point and traces are aligned, the following results:

$\frac{P - S}{P - a} = \frac{Q - T}{Q - b} = \frac{R - U}{R - c} =$ k (constant: ratio of distances on the ray)

which represent two equations between the coordinates of the sources/points/traces. This may also be written as follows:

$P-S=k(P-a)$ $Q-T=k(Q-b)$ $R-U=k(R-c)$

The set of these equations, extended to all of the Source/Image Plane pairs, represents. a matrix; in order to solve it, the number of equations must be greater than or equal to the number of unknowns. Such a matrix can be solved either by using conventional inversion methods or by any other appropriate process.

If n is the number of source/plate/image plane sets, and p is the number of identifiable and visible points on all of these images, the number of unknowns is the following:

| sources | 3n |
| image planes | 6n |
| identifiable points | 3p | or a total of 9n+3p unknowns.

It has been shown that, for each identifiable point, there are two relation equations for each source/ plate pair, or a total of 2pn equations.

In order to solve the system, it is therefore necessary that:

$2pn \geq 9N+3p-S$ where S is the number of known relations between the elements of the set, wherein each of these relations (such as, for example, a distance) reduces the number of independent parameters, therefore the number of equations and the number of points required.

One of the image planes may be used as a reference plane, therefore, a priori, setting the parameters of this plane and of the image it contains.

In this manner, if three independent images are used, seven identifiable points are needed. When there are more than three images, the number of points drops to six, while it increases to twelve when there are only two images.

The number of points required can be reduced by adding more constraints. This applies to the foregoing particular case using a set of points of known geometry, which we shall call "Markers," and which are integrated in or fixed to the object to be examined; the minimum number of points in this case is five.

The process for coordinating images according to the invention may be used to cover a very broad range and many different applications, by adapting the nature of the markers to the type of source employed:

in medical imaging, to coordinate images taken with different means or sources;

in dentistry, markers inserted in and related to the patient's mouth may be used to identify sensitive areas or points;

in industry for three-dimensional viewing in the inspection of manufacture, assembly, clearances, wear and defects;

in non-destructive inspection, simple, portable equipment can be used in this case.

Of course, the invention is not limited to the examples of embodiments described in the foregoing; these may be modified in many ways and still fall within the scope of the invention.

Thus, the cartridge described in the foregoing for dentistry applications may display a different structure wherein the supporting posts of the markers are replaced by arches which provide a rigid connection between the markers and the plane supporting the photographic plate, such that the plate and the markers are respectively positioned on each side of a tooth or group of teeth.

In addition, other systems of points may be used as markers, insofar as they provide for accurate positioning, such as, for example, a circle having a marked center or a triangle having, at one vertex, a line parallel to the opposite side.

Furthermore, the coordination process according to the invention may also be advantageously associated to other investigational techniques such as scintigraphy, by providing, for example, for substitution of one set of markers by another set of a different type, or polyvalent markers.

I claim:

1. A process for generating a plurality of spatially coordinated images of a three-dimensional object, the process comprising the steps of:
   a) providing a plurality of makers disposed in fixed locations relative to the object, the plurality of markers including a first set of at least four markers located in a first reference plane and at least one additional marker spaced from the first reference plane;
   b) providing at least two spaced apart imaging radiators for generating substantially point sources of imaging radiation;
   c) generating a plurality of images of the object on at least a first image plane from the at least two spaced apart imaging radiators, the nature and location of the markers being such that traces of the markers are projected by the imaging radiators to appear on said plurality of images and are individually identifiable;
   d) determining, from the respective projections from each imaging radiator onto each image of at least four of the first set of markers located in the first reference plane, the respective direction of an intersection of each image plane with the first reference plane;
   e) then determining, from the respective projection from each imaging radiator onto each image of the at least one additional marker spaced from the first reference plane, the respective location of each imaging radiator and each image plane relative to the first reference plane; and
   f) coordinating, by knowledge of the locations determined in step e), the different straight lines contributing to form each projected image of said object on the at least one image plane to form the plurality of spatially coordinated images of the object.

2. A process according to claim 1 wherein the at least one additional marker spaced from the first reference plane comprises a second set of four coplanar markers located in a second reference plane, whereby each of the first and second sets of markers forms with any of the markers in the other set the plurality of markers of claim 1.

3. A process according to claim 1 wherein the first reference plane is parallel to at least one image plane and wherein said at least one additional marker comprises at least two markers spaced from the reference plane.

4. A process according to claim 1, wherein the plurality of markers comprises a plurality of interrelated subsystems, each subsystem comprising at least five markers, and wherein at least one subsystem of markers is projected to appear on each of said images.

5. A process according to claim 1 wherein the first image plane is substantially coincident with the first reference plane.

6. A process for generating a plurality of spatially coordinated images of a three-dimensional object and for determining an enclosed three-dimensional space containing said object, the process comprising the steps of:
   a) providing a plurality of markers disposed in fixed locations relative to the object, the plurality of markers including a set of at least two pairs of markers, each pair having a first marker located in a reference plane and a second marker spaced from the reference plane, wherein a line connecting the first and second markers of one pair is parallel to a line connecting the first and second markers of another pair and the lines define a cylindrical projection direction;
   b) providing at least two spaced apart imaging radiators for generating substantially point sources of imaging radiation;
   c) generating a plurality of images of the object on an image plane that is substantially coincident with the reference plane from the at least two spaced apart imaging radiators, the nature and location of said markers being such that traces of the markers are projected by the at least two imaging radiators to appear on said plurality of images and are individually identifiable;
   d) determining the location of each of the at least two imaging radiators from projections of the second marker point of each pair from the at least two imaging radiators, onto the image plane;
   e) determining, from the projections of each second marker point onto the image plane and from the locations of the first markers in the reference plane, the projections of said at least two imaging radiators, parallel to said lines connecting the pairs of first and second markers, onto the image plane and the locations of said at least two imaging radiators in space, relative to the locations of said projections of the second markers;
   f) determining tangency points on said object with lines connecting said at least two imaging radiators locations determined in step e) and selected pairs of points lying on the outlines of the respective projected images, from step c), of the object on the image plane;
   g) constructing cylindrical projections of the tangency points on said object determined in step f) onto the image plane and determining their spatial dimensions;
   h) next determining, from the cylindrical projections of said at least two imaging radiators onto the image plane performed in step e), from the cylindrical projections of the tangency points on said object onto the image plane obtained in step g), and from the projections of said object onto the image plane obtained in step b), a polyhedron in the image plane that delimits the cylindrical projection of the object along said direction of cylindrical projection; and
   i) determining, from the locations of said at least two imaging radiators obtained in step d) and from the projections of the object onto the image plane obtained in step c) the enclosed three-dimensional space containing said object.

7. A process for generating a plurality of spatially coordinated images of a three-dimensional object, the process comprising the steps of:
   a) providing a plurality of markers disposed in fixed locations relative to the object, the plurality of markers including a first set of at least four markers located in a first reference plane and at least one additional marker spaced from the first reference plane;

b) producing on a plurality of image planes a plurality of images of the object by means of radiation from the object, the nature and locations of said markers being such that the markers are projected by collimation to appear as traces on said plurality of images and are individually identifiable;

c) determining, after collimation, traces of the system of markers on each image produced in step b);

d) then determining from the traces of the markers determined in step c), the directions of collimation and the respective locations of each image plane relative to the reference plane; and e) then positioning in space the different collimation lines contributing to form each projected image of said object on each image plane relative to the reference plane to form the plurality of spatially coordinated images of the object.

8. A process for generating a plurality of spatially coordinated planar images of a three-dimensional object, the process comprising the steps of:

a) associating with the object a system of at least p points disposed in fixed locations relative to the object;

b) providing n imaging radiators for generating imaging radiation;

c) projecting images of the object onto n image planes from the n imaging radiators, the nature and location of said p points being such that all the points are projected to appear as traces on said n images, and the numbers n and p satisfying the relation $2pn \leq 29n + 3p - S$, where S represents the number of known geometric relations in the system;

d) deriving a set of linear equations from the alignment of the p points, the traces of said points on the n image planes, and the n imaging radiators;

e) then calculating, from a matrix of the set of equations derived in step c), the coordinates of the n imaging radiators, of the p points, and of the n images to form the plurality of spatially coordinated images of the three dimensional object.

9. A device for generating a plurality of coordinated planar images of a three-dimensional object, the device comprising:

at least four markers disposed in fixed locations relative to the object, at least two of the markers lying in one reference plane;

a plurality of spaced apart imaging radiators for generating substantially point sources of imaging radiation;

at least one image plane for producing planar images of the object projected by said plurality of spaced apart imaging radiators, the nature and location of said markers being such that traces of the markers are projected by the plurality of spaced apart imaging radiators to appear on each of said images and are individually identifiable;

means for determining the respective direction of an intersection of each image plane with each reference lane from the projections of the markers on the image plane;

means for determining the respective location of each of the plurality of spaced apart imaging radiators and each image plane relative to said markers from said directions of the intersections and the projections of the markers; and means for spatially coordinating rays from the the plurality of spaced apart imaging radiators which contribute to form each projected image of said object on each image plane from the respective locations of each image plane, and each of the plurality of spaced apart imaging radiators, relative to the locations of said markers to form the plurality of spatially coordinated images of the object.

10. A device according to claim 9 wherein each marker is a geometric element that significantly affects the transmission of radiation emitted by each of the plurality of spaced apart imaging radiators and wherein the markers include at least four geometric elements lying in one reference plane and at least one geometric element spaced rom the one reference plane.

11. A device according to claim 9 wherein each marker is a geometric element that significantly affects the transmission of radiation emitted by each of the plurality of spaced apart imaging radiators and wherein the markers include at least three geometric elements lying in one reference plane that is substantially parallel to one image plane and at least two geometric elements spaced from the one reference plane.

12. A device according to claim 9 wherein the at least one planar imaging means comprises a substrate that is sensitive to the radiation from the plurality of spaced apart imaging radiators and means for containing said substrate, said containing means having a surface that is substantially coincident with the substrate and that defines the one reference plane; and the at least four markers comprises at least two elongated posts that are parallel to each other, each post having a first end and a second end, each post being fixed by said first end to said surface of the containing means, and the first and second ends of each post comprising marking elements made of a material which affects the transmission of radiation emitted by the plurality of spaced apart imaging radiators.

13. A device according to claim 12 wherein the at least two elongated posts are parallel to each other.

14. A device according to claim 12 wherein the containing means comprises a substantially flat, rigid cartridge forming at least one slot into which the substrate is inserted.

15. A device according to claim 9 wherein the means for determining the respective directions of intersection of each image plane with each reference plane, the means for determining the respective location of each image plane relative to each marker, and the means for spatially coordinating said rays from the the plurality of spaced apart imaging radiators comprise a computer connected to image analyzing devices and programmed to calculate coordinates of the sources, the markers, and each image plane.

16. A device for generating a plurality of spatially coordinated planar images of a three-dimensional object that emits radiation, the device comprising:

a plurality of radiation emitting markers disposed in fixed locations relative to the object, the markers including at least four markers defining at least one reference plane and a fifth marker spaced from the one reference plane;

imaging means for producing images of the object on at least one image plane by collimation of the radiation from the object, the nature and location of said markers being such that the marker radiation causes individually identifiable traces of the markers to appear after collimation on each of said images;

means for determining the collimation direction and the respective location of each image plane relative to the markers from the traces of said markers on the image plane; and means for spatially coordinating the collimated rays contributing to form each image of said object on each image plane from the respective locations of each image plane and said collimation directions relative to the locations of said markers to form the plurality of spatially coordinated planar images of the object.

17. A device according to claim 16 wherein the means for determining the collimation direction and the means for coordinating the collimated rays comprise a computer connected to image analyzing devices and programmed to calculate coordinates of the object, the markers, and each image plane.

* * * * *